United States Patent [19]
Ohshita

[11] Patent Number: 5,245,375
[45] Date of Patent: Sep. 14, 1993

[54] FINDER OPTICAL SYSTEM

[75] Inventor: Koichi Ohshita, Tokyo, Japan

[73] Assignee: Nikon Corporation, Tokyo, Japan

[21] Appl. No.: 985,491

[22] Filed: Nov. 30, 1992

Related U.S. Application Data

[63] Continuation of Ser. No. 757,818, Sep. 11, 1991, abandoned.

[30] Foreign Application Priority Data

Sep. 25, 1990 [JP] Japan ................. 2-254582

[51] Int. Cl.⁵ ............................................. G03B 13/02
[52] U.S. Cl. .................................. 354/219; 354/289.1
[58] Field of Search ............... 354/219, 222, 224, 225, 354/289.1-289.12, 465, 471-475

[56] References Cited

U.S. PATENT DOCUMENTS 4,833,494 5/1989 Ohsawa .................. 354/219

Primary Examiner—David M. Gray
Attorney, Agent, or Firm—Shapiro and Shapiro

[57] ABSTRACT

In a finder optical system wherein a field frame and a field lens are placed near an objective lens and a real image plane made by the objective lens and a prism having a reflecting surface is disposed between the field frame and an eyepiece, a transmitting surface substantially perpendicular to the optical axis of reflected light reflected by the reflecting surface of the prism is provided on the reflecting surface of the prism or by cutting away the reflecting surface, and an information display system for displaying desired information through that transmitting surface is provided. The information display system is provided at a position optically symmetrical with the field frame.

15 Claims, 4 Drawing Sheets

1

FINDER OPTICAL SYSTEM

This is a continuation of application Ser. No. 757,818 filed Sep. 11, 1991, now abandoned.

BACKGROUND OF THE INVENTION

Field of the Invention

This invention relates to a finder optical system utilized in an optical instrument.

Related Background Art

The finder optical system according to the prior art is provided with various displays of information necessary for photographing, for example, shutter speed, aperture value, light emission of a flash device, etc. A construction shown, for example, in FIG. 2 of the accompanying drawings is known to enable these information display images and the object image by an objective lens to be all observed.

This construction has an objective lens o and a field lens F on the finder optical axis, has a field frame X at the imaging position and has an illuminating light source L and a reflecting member M near the field lens F off the finder optical axis, and with the aid of this reflecting member M, a light beam 2 from the illuminating light source L illuminates an information display member Y present on the same plane as the field frame X.

This construction has the advantage that the visibility of the object image and the visibility of the information display image coincide with each other, but as is apparent from FIG. 2, the light beam of the object image assumes its optical path at a location farthest from the finder optical axis in the field lens F. Therefore, it has been necessary to make such a design that the illuminating light beam of the information display image does not overlap with the marginal light beam of the object image, and also from the optical construction, it has been necessary that a portion necessary for holding the lens be provided on the marginal edge of the field lens F.

SUMMARY OF THE INVENTION

Therefore, in the prior-art construction as described above, as shown in FIG. 3A of the accompanying drawings, the object image B and the information display image I become spaced apart from each other and hard to see, and the addition of an information display system has led to a problem such as the bulkiness of a Porro prism and an eyepiece and accordingly of the finder optical system.

So, the present invention has as its object the provision of a compact finder optical system of simple construction in which the object image and the information display image are adjacent in the finder field of view and easy to see.

For the above object, according to the present invention, in a construction wherein a field frame and a field lens are placed near an objective lens and a real image plane made by the objective lens and a prism having a reflecting surface is disposed between the field frame and an eyepiece, a transmitting surface substantially perpendicular to the optical axis of reflected light reflected by the reflecting surface of the prism is provided on the reflecting surface of the prism or by cutting away the reflecting surface, and an information display system for displaying desired information through that transmitting surface is provided. Also, the information display system is provided at a position optically symmetrical with the field frame.

According to the finder optical system of the above-described construction, the transmitting surface substantially perpendicular to the optical axis of the reflected light is provided on the reflecting surface of the prism, whereby the field frame and the information display member can be provided on discrete planes. Therefore, it becomes possible to display an information display image at a free position relative to the object image on the field frame. Accordingly, the object image and the information display image can be brought close to each other and therefore, the information display image in the finder becomes easy to see. Also, the finder optical system according to the present invention can be constructed compactly as compared with the finder optical system according to the prior art.

As described above, according to the present invention, the information display image can be displayed at a free position in the finder, and the information display image can be disposed closer to the object image than in the prior art and therefore becomes easier to see. In addition, there is provided a finder optical system of simple and compact construction.

DESCRIPTION OF THE PREFERRED EMBODIMENTS

Figure 1:
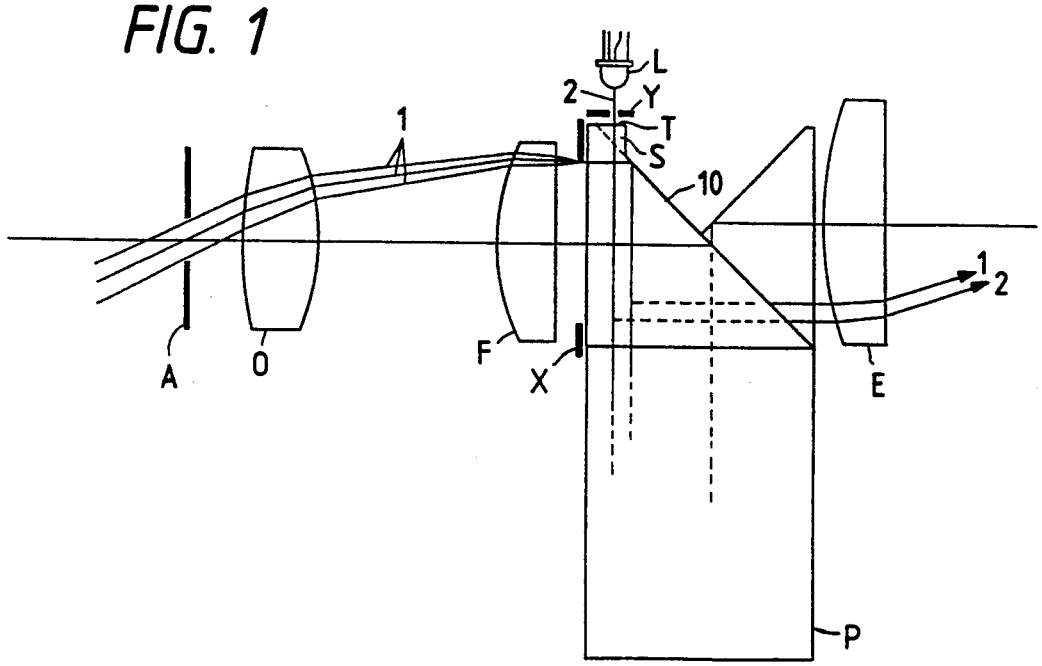
FIG. 1 shows the optical path of a finder optical system according to a first embodiment of the present invention.
Figure 3A:
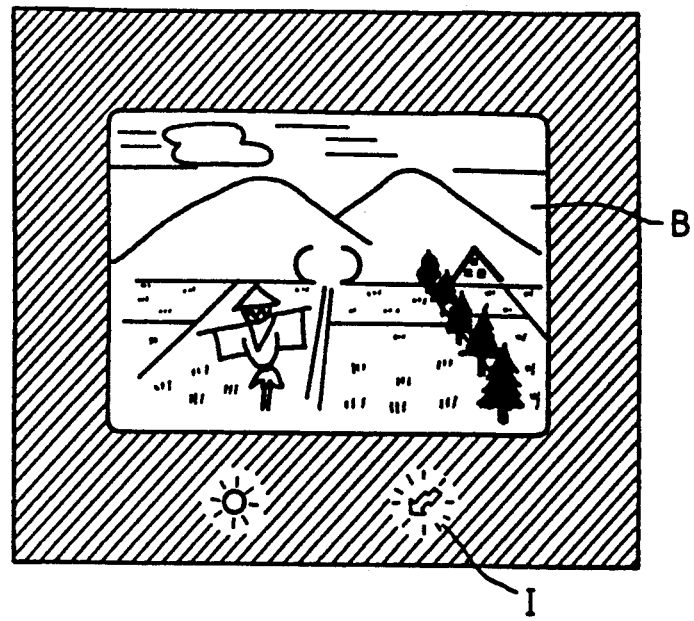
FIG. 3A shows the field of view of the finder optical system according to the prior art.
Figure 3B:
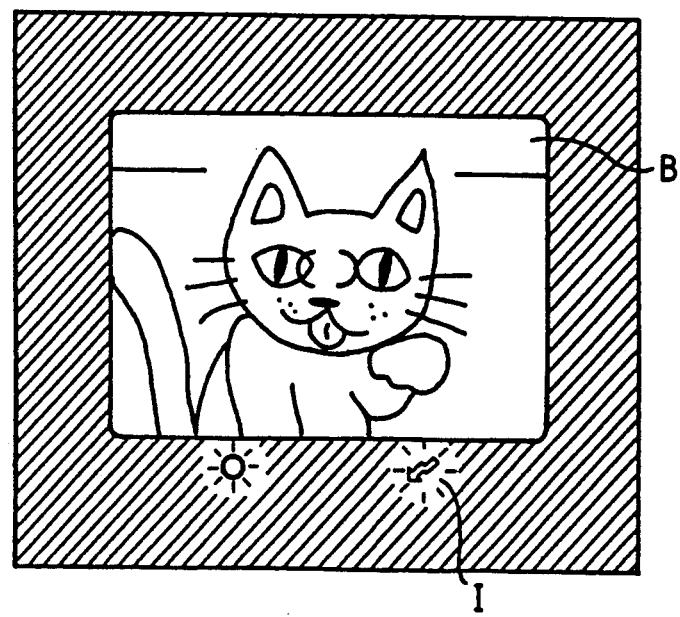
FIG. 3B shows the field of view by the construction of FIG. 1.

Some embodiments of the present invention will hereinafter be described with reference to the drawings. FIG. 1 is an optical path view showing a first embodiment of the present invention, and shows the optical path from the side of a finder optical system, and FIG. 3B shows an example of the finder field of view in the embodiment of FIG. 1.

In the finder optical system of the first embodiment, the light beam 1 of the object image B passes through an objective lens o on the finder optical axis, a field frame X disposed at the imaging position of the objective lens o and a field lens F disposed near the object side of the field frame X to a Porro prism P. The light beam 1 reflected by a first reflecting surface 10 is reflected three times in the Porro prism, and thereafter emerges therefrom.

Description will now be made of the optical path of the light beam 2 of an information display image I. The light beam 2 emitted from an illuminating light source L located off the finder optical axis enters from an information display frame Y as an information display member into a transmitting surface T perpendicular to the optical axis of the reflected light reflected by the first reflecting surface 10. The transmitting surface T is formed as the entrance surface T of an auxiliary prism S. Like the light beam 1, the light beam 2 is reflected three times in the Porro prism P, and thereafter emerges therefrom. By the light beam 1 and the light beam 2 which have thus emerged, a finder image is formed through an eyepiece as shown, for example, in FIG. 3B. Now, the aforementioned auxiliary prism S refers to the partly protruding portion on the first reflecting surface of the prism.

As described above, the field frame X and the information display frame Y are disposed on discrete planes, whereby it is possible to dispose the information display image I at a free position. Therefore, the object image B and the information display image I can be displayed close to each other as shown in FIG. 3B and the light beam 1 of the object image B assumes its optical path near the optical axis in the prism P and thus, overlapping between the light beam 1 and the light beam 2 of the information display image I can be prevented. Accordingly, as compared with the prior art shown in FIG. 2, the compactness of the Porro prism P and the eyepiece E and the compactness of the finder optical system become possible.

In the present embodiment, the vertical angle of the auxiliary prism S is 45° and the angle formed by the reflecting surface with respect to the transmitting surface T is 45°, but according to the present invention, there can be a transmitting surface perpendicular to the optical axis of the optical path of the object image reflected by the reflecting surface. The locations of the field frame X and the information display frame Y are at distances equal from the eyepiece E, as a numerical value obtained by dividing the optical path by the refractive index of the medium, i.e., the so-called air-converted optical path length, and therefore the visibility of the information display image I coincides with the visibility of the object image B.

Also, in recent years, the technique of molding optical parts by the use of plastic materials has been improved and the technique of molding optical prisms has also been established and therefore, it is easy to mold the auxiliary prism S integrally with the Porro prism P having the first reflecting surface 10, as shown in FIG. 1.

Figure 2:
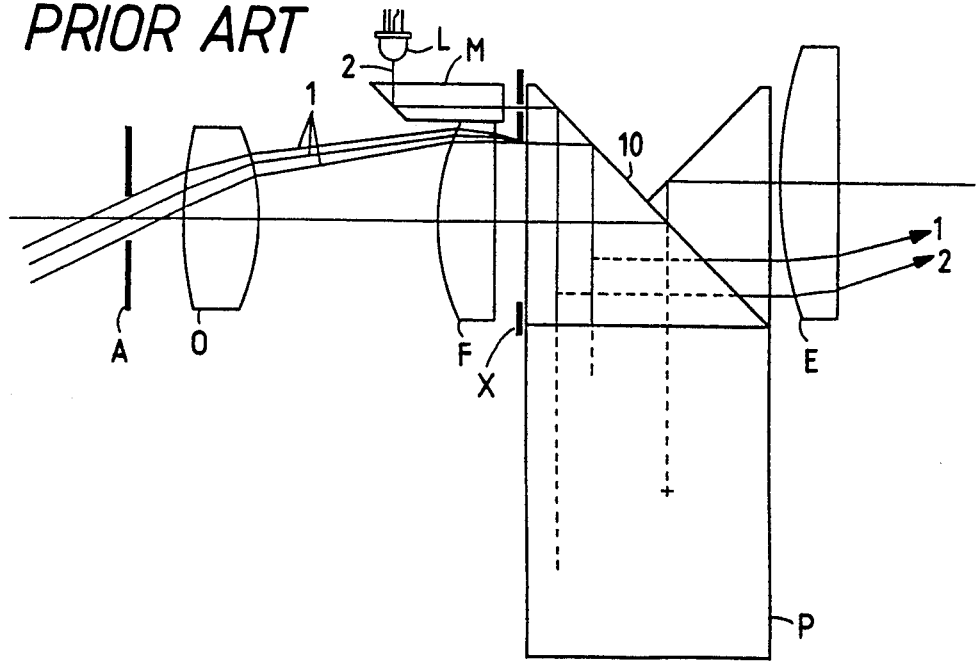
FIG. 2 shows the optical path of a finder optical system according to the prior art.

Thus, in the present invention, the reflecting member M in the prior-art construction shown in FIG. 2 becomes unnecessary, and this leads to a simpler construction, which in turn contributes to a reduction in cost.

Figure 4A:
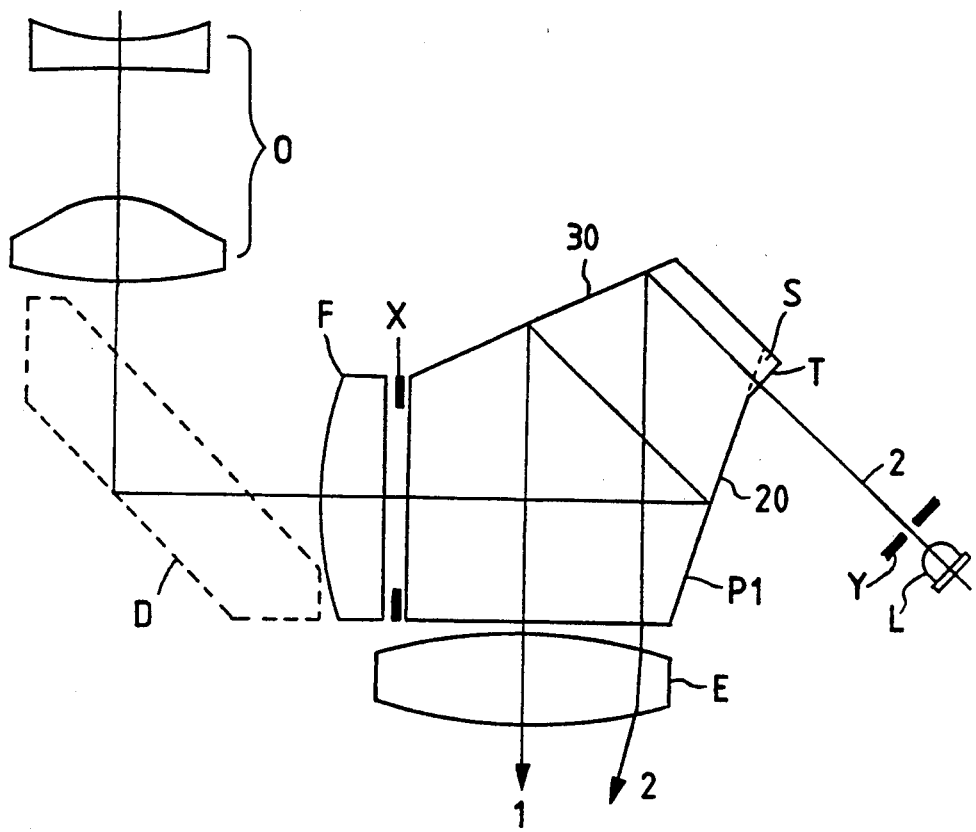
FIG. 4A shows a second embodiment of the present invention.

A second embodiment of the present invention will now be described. FIG. 4A is an optical path view in which a finder optical system for making the object image into an erect positive image by the use of a roof mirror D and a pentaprism $P_1$ is seen vertically from just above it. A transmitting surface T perpendicular to the optical axis of reflected light reflected by a first reflecting surface 20 of the pentaprism is provided on the first reflecting surface of the pentaprism, as in the previous embodiment. The transmitting surface T is formed as the entrance surface T of an auxiliary prism.

The light beam of the object image B passes through an objective lens o, the roof mirror D, a field lens F and a field frame X disposed on the image plane, is reflected by the first reflecting surface 20 of the pentaprism $P_1$, is again reflected by a second reflecting surface 30 of the pentaprism and becomes an erect image. The light beam 2 of the information display image I is emitted from an illuminating light source L and enters from an information display frame Y as an information display member into the entrance surface T of the auxiliary prism S. The light beam 2 which has entered the pentaprism $P_1$ is reflected by the second reflecting surface 30 and emerges into an eyepiece E.

Figure 4B:
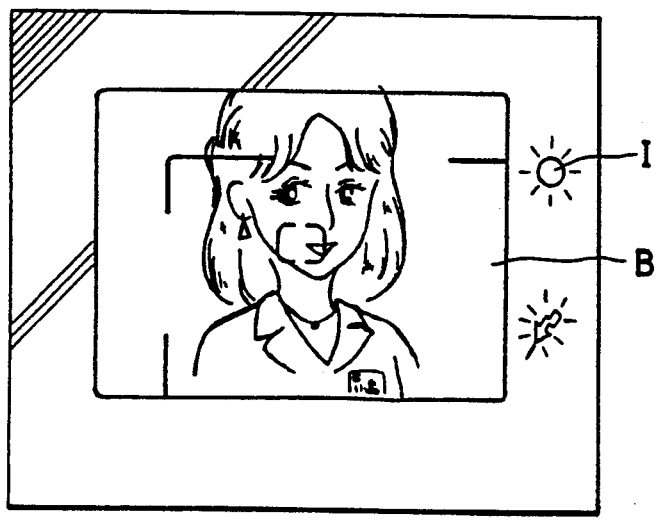
FIG. 4B shows the field of view in the FIG. 4A embodiment.

Now, the auxiliary prism S refers to the partly protruding portion on the first reflecting surface of the prism. In the present embodiment, the vertical angle of the auxiliary prism S is 22.5°, but as in the aforedescribed embodiment, there can be provided a transmitting surface penpendicular to the optical axis of the reflected light reflected by the first reflecting surface. Again in the present embodiment, as in the previous embodiment, the field frame X and the information display frame Y are made discrete from each other and therefore, it is possible to dispose the information display image I at a free position. With such a construction, the object image B and the information display image I can be displayed close to each other, as shown in FIG. 4B.

To equalize the visibility of the object image B and the visibility of the information display image I, the field frame X and the information display frame Y are provided at optically equal positions. At this time, the information display frame Y is disposed at a location somewhat spaced apart from the pentaprism $P_1$. Such disposition makes the reflecting member M unnecessary and thus, leads to a simple construction.

As the information display member, not only the information display frame but also a light emitting element such as a light emitting diode may of course be directly disposed. In the described embodiments, an information display system is constituted by the information display member and a light source for illuminating it. Also, in recent years, the technique of molding optical parts by the use of plastic materials has been improved and the technique of molding optical prisms has also been established and therefore, it is easy to mold the auxiliary prism S as shown in FIG. 4A integrally with the pentaprism $P_1$ having the first reflecting surface 20. Therefore, again in this case, the reflecting member M in the prior-art construction shown in FIG. 2 becomes unnecessary, and this leads to a simpler construction, which in turn contributes to a reduction in cost.

Figure 5:
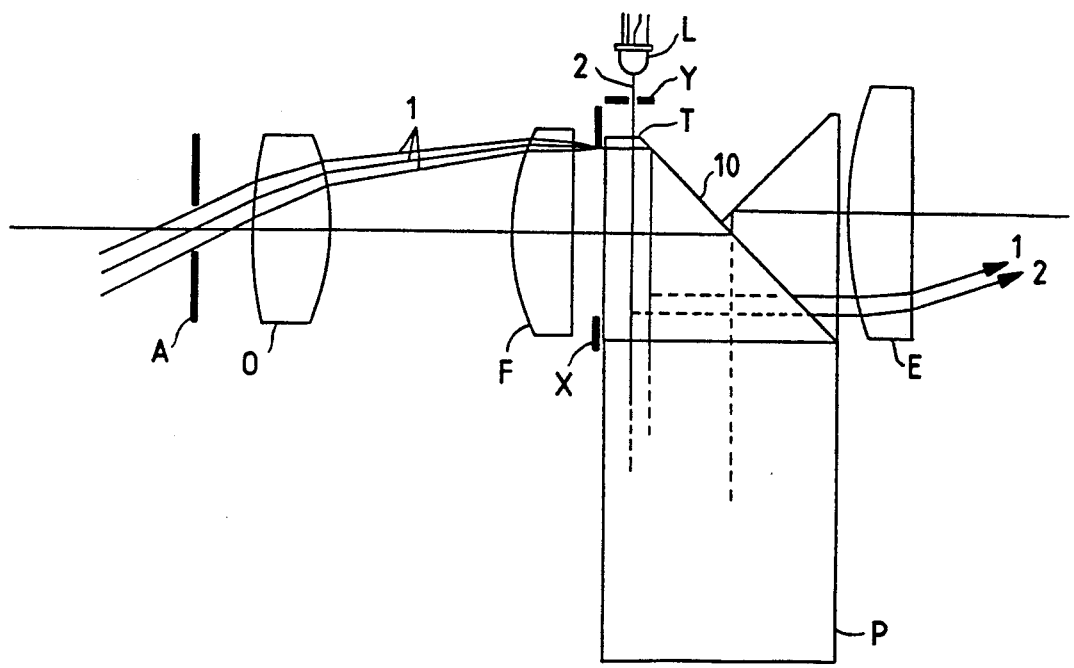
FIG. 5 shows a third embodiment of the present invention.

An optical path view of a third embodiment of the present invention is shown in FIG. 5. In this embodiment, unlike the aforedescribed first and second embodiments, a part of the first reflecting surface 10 is cut away to provide a transmitting surface. As in the previous two embodiments, the transmitting surface is provided on the first reflecting surface 10 and substantially perpendicularly to the optical axis of reflected light reflected by the first reflecting surface 10. The first light beam 1 is reflected by the first reflecting surface 10 and is reflected three times in the prism, and thereafter emerges therefrom. The light beam 2 of the information display image I is emitted from an illuminating light source L and enters from an information display frame Y as an information display member into the transmitting surface T. The light beam 2 which has entered the transmitting surface T is reflected three times in the prism and emerges into an eyepiece E.

By adopting such construction, further compactness can be achieved and this is advantageous in terms of cost, but by a part of the prism being cut away, ghost becomes apt to occur and therefore, to put this construction into practical use, the prevention of ghost light would become necessary.

What is claimed is:

1. A finder optical system including:
   an objective lens;
   a field frame and a field lens disposed near a real image plane made by said objective lens;
   an eyepiece for observing therethrough an object image formed on the real image plane made by said objective lens;
   an erect prism having a plurality of reflecting surfaces and disposed between said field frame and said eyepiece;
   a transmitting surface provided on a first one of said plurality of reflecting surfaces of said prism substantially perpendicularly to the optical axis of reflected light from said one reflecting surface; and
   an information display system for displaying desired information through said transmitting surface.

2. A finder optical system according to claim 1, wherein said transmitting surface is protrudedly provided on a portion of said one reflecting surface.

3. A finder optical system according to claim 1, wherein said information display system has an information display member provided at a position optically symmetrical with the field frame with respect to said one reflecting surface.

4. A finder optical system according to claim 3, wherein said information display member includes an information display frame.

5. A finder optical system according to claim 3, wherein said information display member includes a light emitting diode.

6. A finder optical system including:
   an objective lens;
   a field frame and a field lens disposed near a real image plane made by said objective lens;
   an eyepiece for observing therethrough an object image formed on the real image plane made by said objective lens;
   a prism means for erecting the image, said prism means having a plurality of reflecting surfaces and disposed between said field frame and said eyepiece;
   a transmitting surface provided on a first one of said plurality of reflecting surfaces of said prism substantially perpendicularly to the optical axis of reflected light from said one reflecting surface; and
   an information display system for displaying desired information through said transmitting surface.

7. A finder optical system according to claim 6, wherein said transmitting surface is protrudedly provided on a portion of said one reflecting surface.

8. A finder optical system according to claim 6, wherein said information display system has an information display member provided at a position optically symmetrical with the field frame with respect to said one reflecting surface.

9. A finder optical system according to claim 8, wherein said information display member includes an information display frame.

10. A finder optical system according to claim 8, wherein said information display member includes a light emitting diode.

11. A finder optical system including:
    an objective lens;
    a field frame and a field lens disposed near a real image plane made by said objective lens;
    an eyepiece for observing therethrough an object image formed on the real image plane made by said objective lens;
    a prism having a plurality of reflecting surfaces and disposed between said field frame and said eyepiece;
    a transmitting surface provided on a first one of said plurality of reflecting surfaces of said prism substantially perpendicularly to the optical axis of reflected light from said one reflecting surface; and
    an information display system for displaying desired information through said transmitting surface.

12. A finder optical system according to claim 1, wherein said transmitting surface is protrudedly provided on a portion of said one reflecting surface.

13. A finder optical system according to claim 11, wherein said information display system has an information display member provided at a position optically symmetrical with the field frame with respect to said one reflecting surface.

14. A finder optical system according to claim 13, wherein said information display member includes an information display frame.

15. A finder optical system according to claim 13, wherein said information display member includes a light emitting diode.

* * * * *